(12) United States Patent
Cohen et al.

(10) Patent No.: US 8,811,760 B2
(45) Date of Patent: Aug. 19, 2014

(54) CODING IMAGES USING INTRA PREDICTION MODES

(75) Inventors: Robert A. Cohen, Somerville, MA (US);
Xiaozhong Xu, Princeton, NJ (US);
Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 262 days.

(21) Appl. No.: 13/281,334

(22) Filed: Oct. 25, 2011

(65) Prior Publication Data

US 2013/0101232 A1    Apr. 25, 2013

(51) Int. Cl.
*G06K 9/46*    (2006.01)

(52) U.S. Cl.
USPC ...................................... 382/238; 375/240.14

(58) Field of Classification Search
None
See application file for complete search history.

(56) References Cited

U.S. PATENT DOCUMENTS

| | | | |
|---|---|---|---|
| 2003/0223645 A1* | 12/2003 | Sun et al. ....................... | 382/239 |
| 2008/0175321 A1* | 7/2008 | Sun et al. ................. | 375/240.15 |
| 2011/0194603 A1* | 8/2011 | Laimema et al. ......... | 375/240.12 |
| 2011/0255591 A1* | 10/2011 | Kim et al. ................. | 375/240.02 |
| 2011/0280304 A1* | 11/2011 | Jeon et al. ................. | 375/240.12 |
| 2011/0293001 A1* | 12/2011 | Lim et al. .................. | 375/240.12 |
| 2012/0014438 A1* | 1/2012 | Segall et al. .............. | 375/240.12 |
| 2012/0057630 A1* | 3/2012 | Saxena et al. ............. | 375/240.03 |
| 2012/0147955 A1* | 6/2012 | Budagavi .................. | 375/240.12 |
| 2012/0189059 A1* | 7/2012 | Segall ........................ | 375/240.16 |
| 2012/0328009 A1* | 12/2012 | Sasai et al. ................ | 375/240.12 |
| 2013/0107957 A1* | 5/2013 | Rabinovitch et al. ..... | 375/240.15 |
| 2013/0114713 A1* | 5/2013 | Bossen et al. ............. | 375/240.12 |
| 2013/0121401 A1* | 5/2013 | Zheludkov et al. ....... | 375/240.02 |
| 2013/0129237 A1* | 5/2013 | Yie et al. ........................ | 382/233 |

OTHER PUBLICATIONS

Ehsan Maani et al., "CE6.c: Differential Coding of Intra Modes," 6th Meeting: Torino, IT, Jul. 14-22, 2011; Joint Collaborative Team on Video Coding (JCT-VC); of ITU-T SG16 WP3 and ISO/IEC JTC1/SC29/WG11; Document: JCTVC-F566.

* cited by examiner

*Primary Examiner* — Jingge Wu
(74) *Attorney, Agent, or Firm* — Dirk Brinkman; Gene Vinokur

(57) ABSTRACT

A system and a method for decoding at least a portion of an image includes determining a current prediction mode based on a combination of a prediction mode residue and a function of at least one previous prediction mode and decoding the portion of the image using the current prediction mode.

18 Claims, 9 Drawing Sheets

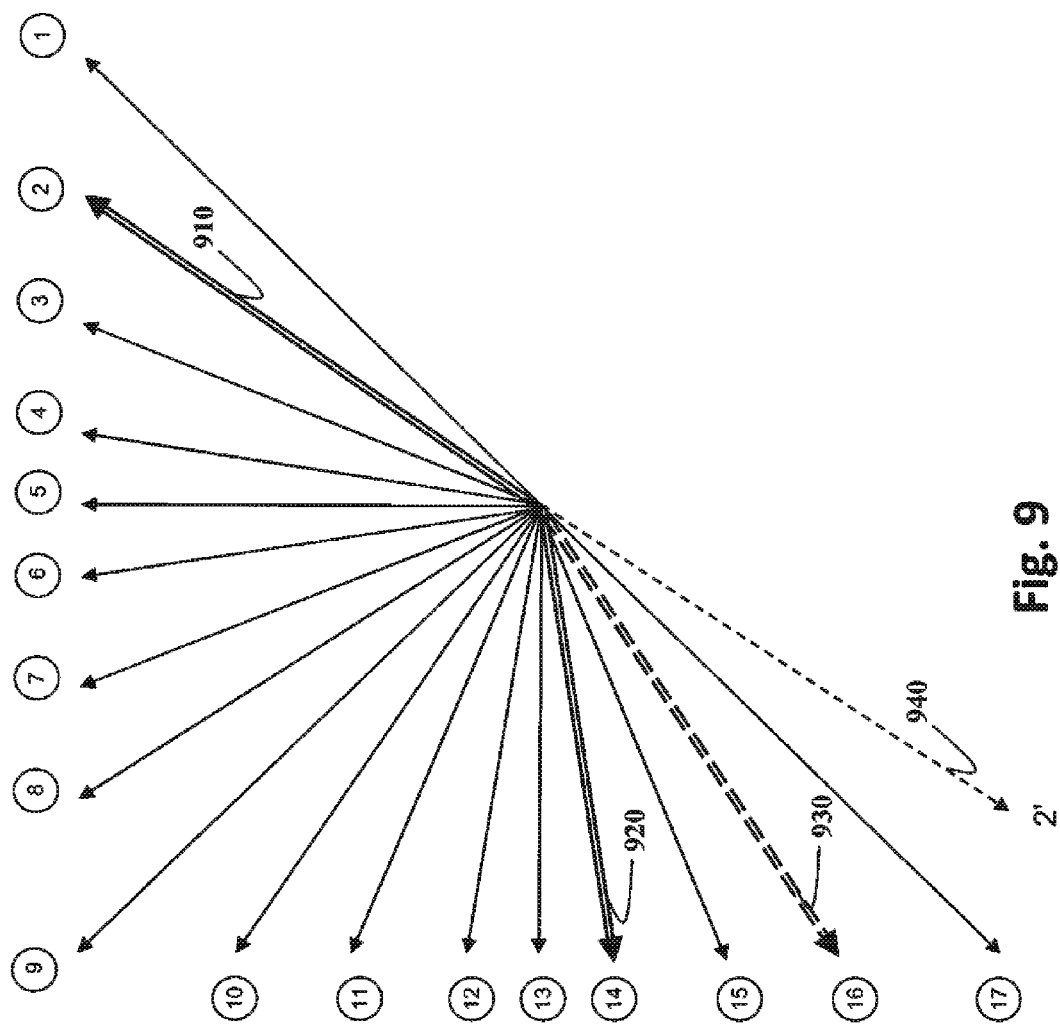

CODING IMAGES USING INTRA PREDICTION MODES

FIELD OF THE INVENTION

The invention relates generally to coding images, and more particularly to methods for coding images using prediction modes.

BACKGROUND OF THE INVENTION

In video coding, compression efficiency is achieved by exploiting spatial and temporal redundancies in an input sequence of images, to produce a bit-stream representing the video using fewer bits than found in the uncompressed sequence. Intra coding are coding techniques using only spatial redundancy, i.e., pixels in a block of the current image exploit redundancy from previously-decoded pixels in the same image. Temporal redundancy is leveraged in inter coding, where pixel data from previously-decoded images other than the current one are used in the compression process.

The High Efficiency Video Coding (HEVC) standard, currently under development, provides that intra coding uses intra prediction modes. Each intra-coded block is assigned an intra prediction mode, which indicates how previously-decoded pixels are used to reconstruct the current block of pixels. This mode typically indicates an angle or direction along which the difference between current and previously-decoded pixels is analyzed. Compression efficiency is achieved when the data needed to represent the difference between the estimated and actual pixel require fewer bits to represent than the actual pixel itself.

Before decoding a block of pixels, the decoder has to know a prediction mode to use. Currently, this prediction mode is signaled as an index, or value, in the compressed bit-stream. An encoder typically tests several different intra prediction modes, and then selects the best one to use for the current block. The index for this best mode is signaled in the bit-stream. However, the transmission of the index increases the size of the bit-stream.

According to the latest working draft of the HEVC standard, JCTVC-F803, "WD4: Working Draft 4 of High-Efficiency Video Coding," version 4, Oct. 8, 2011, up to two intra prediction modes are computed as the modes most likely to be used to code the current block. After the encoding process selects the best intra prediction mode for the current block, if one of these most likely modes, or most probable modes (MPM) were selected, then a short set of flags is sent to indicate that the MPM includes the current mode, along with which of these modes to use. The decoder computes the MPM in the same way as the encoder, so the MPM set need not be signaled in the bit-stream. If, however, the current mode is not in the MPM, then an index of the current mode must explicitly be signaled in the bit-stream.

Currently, a ranking table is maintained by both the encoder and decoder, to keep track of the previously-used modes based upon how frequently the modes have been used so far. Because the current mode is more likely to be near the top of the ranking table than at the bottom, the location of the current mode in the ranking table is signaled using fewer bits near the top of the table, and using more bits closer to the bottom of the table. Compression efficiency is achieved when the modes at the top of the table are used more frequently than the other modes.

Maintaining and updating the ranking requires both processing cycles and memory. Also, the ranking table is updated for each block in the coding process, so blocks near the end of the coding process, e.g., the lower-right blocks, use a ranking table that was computed based on statistics over the entire previous image. Depending upon the size of the image, blocks that are far apart may have completely different characteristics, thus making the ranking table inefficient until it is updated using many blocks from the current region of the image. Furthermore, the intra prediction modes depend upon the content of the image, and for some types of images the probability of entries in the ranking table may be more uniform than desired, reducing the compression efficiency for coding the intra prediction mode.

Hence, there is a need for a method of coding images using prediction modes that overcomes the abovementioned drawbacks.

SUMMARY OF THE INVENTION

It is an object of a present invention to provide a method for coding, i.e., encoding and decoding, of at least a portion of an image. It is another object of the invention to provide such a method that optimizes, e.g., minimizes, a size of an encoded bit-stream transmitted over a channel. It is yet another object of the invention to provide a method that does not require that a ranking table tracking the previously-used modes.

Embodiments of the invention are based on a realization that there is a statistical dependency between a current and a previous prediction modes used to encode/decode a portion of an image. Specifically, the difference between the current and previous prediction modes tends to be small. Accordingly, instead of transmitting the actual current prediction mode over the channel, some embodiments transmit only a prediction mode residue, e.g., a difference between the current and the previous prediction modes.

On one hand, such prediction mode residue can be determined by the encoder. One the other hand, because the decoder has the previous prediction mode, the decoder can restore the current prediction mode from the previous one based on the prediction mode residue. Also, because statistically the smaller values of the prediction mode residue occur more frequently than larger values, a size of the transmitted data is minimized. For example, for fixed-codeword variable length codes, a shorter length codeword is assigned to a prediction mode residue having a smaller value.

In various embodiments, the value of the prediction mode residue is combined, e.g., added, with a function of at least one previous prediction mode to determine the current prediction mode. Some embodiments use the previous prediction modes of the previously decoded portion of the image neighboring the currently decoded portion. For example, the previous prediction modes can include one or two previously predicted modes that can be stored in a set of most probable modes (MPM). For example, in one embodiment, the portion of the image to be decoded includes a current prediction unit (PU), and the two previous prediction modes includes a left prediction mode of a left PU and a top prediction mode of a top PU. Because small prediction mode residues occur more frequently than large prediction mode residues, the need for the ranking table tracking the previously-used modes is eliminated.

In one embodiment, the function is a value of the previous prediction mode. In another embodiment, the function determines an average or a median of two previous prediction modes. In one variation of this embodiment, the result of the function combined with the prediction mode residue is mapped to the closest available prediction mode, Also, some embodiments of the invention take advantage of the recognition that the numbering scheme currently used in the working draft of the HEVC standard indexes a planar (non-angular) mode as 0, vertical mode as 1, horizontal mode as 2, DC mode (non-angular) as 3, and other angular modes with higher indices. It makes no physical sense to use these indices in a function such as averaging or computing the median, because adjacent prediction angles are not consecutively numbered. In order to use prediction mode indices in the function, some embodiments of the invention map the indices of the available prediction mode to a set of consecutive values.

Accordingly, one embodiment of the invention discloses a method for decoding at least a portion of an image, including determining a current prediction mode based on a combination of a prediction mode residue and a function of at least one previous prediction mode; and decoding the portion of the image using the current prediction mode, wherein the steps of the method are performed by a processor.

Another embodiment discloses a method for decoding at least a portion of an image, including receiving a prediction mode residue as a part of an encoded bit-stream; retrieving a set of previous prediction modes from a set of most probable modes (MPM); reordering indexes of the set of previous prediction modes sequentially according to a circular representation of angular intra prediction modes; determining a current prediction mode based on a sum of the prediction mode residue and a result of a function of the set of previous prediction modes, wherein the prediction mode residue includes a difference between the result of the function and the current prediction mode on the circular representation; and decoding the portion of the image using the current prediction mode, wherein the steps of the method are performed by a processor.

Yet another embodiment discloses a decoder for decoding at least a portion of an image based on a current prediction mode, comprising: a decoding and parsing module for decoding and parsing bit-stream to produce transform coefficients and control data, wherein the control data includes a prediction mode residue representing a difference between a result of the function of a set of previous prediction modes and the current prediction mode; and an intra prediction mode generator for determining the current prediction mode based on a combination of the prediction mode residue and the result of the function.

Explanation of Terms

Below are provided explanation of some terms used by embodiments of the invention and/or by the working draft of the HEVC standard. The explanation is provided for clarity purpose only and is not intended to limit the scope of the invention. As skilled artisan would recognize, the embodiments of the invention can be used within and outside the scope of the HEVC standard.

Coding Layers

The hierarchical coding layers defined in the standard include video sequence, image, slice, and treeblock layers. Higher layers contain lower layers.

Treeblock

According to the proposed standard, an image is partitioned into slices, and each slice is partitioned into a sequence of treeblocks (TBs) ordered consecutively in a raster scan. Images and TBs are broadly analogous to frames and macroblocks respectively, in existing video coding standards such as H.264/AVC. The maximum allowed size of the TB is 64×64 pixels luma (intensity) and chroma (color) samples.

Coding Unit

A Coding Unit (CU) is the basic unit of splitting used for Intra and Inter prediction. Intra prediction operates in the spatial domain of a single image, while Inter prediction operates in the temporal domain among the image to be predicted and a set of previously-decoded images. The CU can have a square shape, and can be 128×128 (LCU), 64×64, 32×32, 16×16 and 8×8 pixels. The CU allows recursive splitting into four equally sized blocks, starting from the TB. This process gives a content-adaptive coding tree structure comprised of CU blocks that can be as large as the TB, or as small as 8×8 pixels.

Prediction Unit (PU)

A Prediction Unit (PU) is the basic unit used for carrying the information (data) related to the prediction processes. In general, the PU is not restricted to being square in shape, in order to facilitate partitioning, which matches, for example, the boundaries of real objects in the image. Each CU may contain one or more PUs.

Portion of the Image

A portion of the image can be any part of the image including, but not limited to, the image, PU, CU, slice, and TB.

Reference Sample

Each PU of intra slice is predicted by its neighboring reconstructed pixels, also known as reference samples. To be more specific, in HEVC, the row above the current PU and the column to the left of the current PU are used as reference samples for predicting the samples in current PU.

Intra Prediction Mode

Intra prediction modes define the way how reference samples can be used to predict the samples in the current PU. Intra prediction modes consist of some angular based modes and some non-angular based modes. Angular modes are modes that generally perform the prediction along a specific direction, e.g. vertically, horizontally, or at some angle. A non-angular mode applies prediction from neighboring blocks in a way that does not correspond to one specific direction. For non-angular modes, a current pixel is predicted using a weighted sum of multiple reference samples, without using the directional information between the current sample and the ones in the reference sample set. In the current HEVC draft standard, PU sizes of 8×8, 16×16 and 32×32 use 33 angular modes and 2 non-angular modes (DC mode and Planar mode); for 4×4 PUs, 16 angular modes and 2 non-angular modes are used. Other PU sizes can use a smaller set of intra prediction modes.

Intra Prediction Sample

According to intra prediction mode, a prediction sample is generated for the current sample, from the above mentioned reference samples. Intra prediction is processed by subtracting the prediction sample from the current sample. The residue of this subtracting is referred as the intra prediction residue. Typically, the intra prediction residues are further processed using transformation quantization and entropy coding.

Most Probable Mode

A set of one or more intra prediction modes, which are derived from, e.g., neighboring previously-decoded PUs, are used to predict the current intra prediction mode. This set is called the Most Probable Mode(s) or MPM.

BRIEF DESCRIPTION OF THE DRAWINGS

FIGS. 6-9 are diagrams of circular representation of the prediction modes according to some embodiments of the invention.

DETAILED DESCRIPTION OF THE INVENTION

Embodiments of our invention provide a system and a method for coding intra prediction modes using the correlation between the current and the previous intra prediction modes. Coding encompasses encoding and decoding. Generally, encoding and decoding are performed in a codec (CODer-DECcoder). The codec is a device or computer program capable of encoding and/or decoding a digital data stream or a signal. For example, the coder encodes a bit-stream or signal for compression, transmission, storage or encryption, and the decoder decodes the encoded bit-stream for playback or editing.

Embodiments of the invention are based on a realization that there is a statistical dependency between a current prediction mode and one or many previous prediction modes used to encode/decode some portions of an image. Specifically, the difference between the current and previous prediction modes tends to be small. Accordingly, instead of transmitting the actual current prediction mode over the channel, some embodiments transmit only a prediction mode residue, e.g., a difference between the current and the previous prediction modes.

Figure 1:
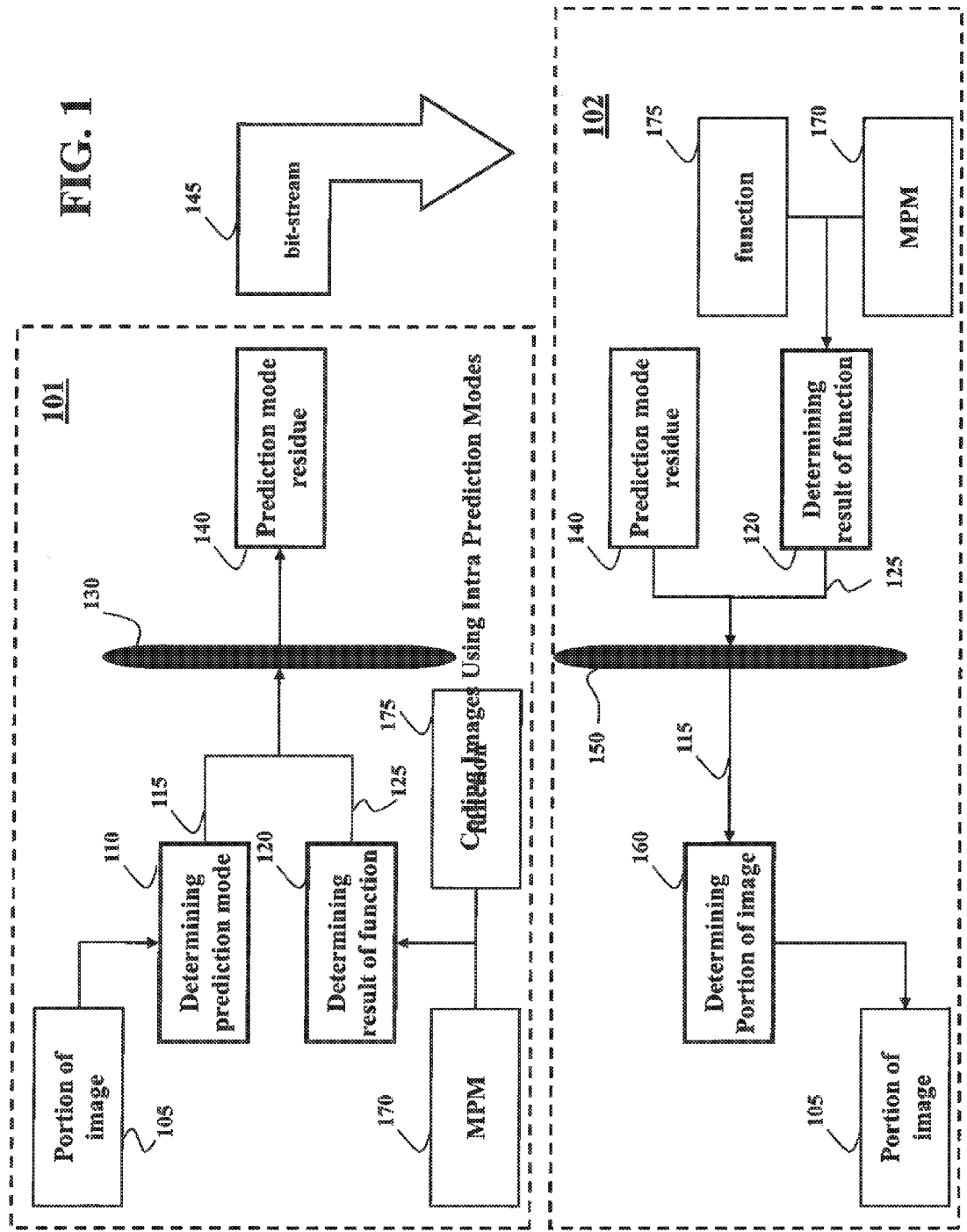
FIG. 1 is a block diagram of an encoder and a decoder employing some principles of the invention.

FIG. 1 shows a block diagram of an encoder 101 and a decoder 102 employing some principles of the invention. Specifically, the encoder determines 110 a current prediction mode 115 to encode a portion of the image 105. For example, the encoder can encode the portion of the image with various prediction modes and select the best prediction mode, e.g., resulting in the best compression. Next, the encoder determines 120 a result 125 of a function 175 of at least one previous prediction mode. The function 175 is usually selected to predict or estimate the current prediction mode, such the result of the function represent an estimation of the current prediction mode. Typically, the previous prediction modes are selected from a set 170 of most probable modes (MPM) as inputs to the function.

The current prediction mode and the result of the function are combined 130 to determine a prediction mode residue 140. Generally, the combination 130 can be any possible operation such as addition, division, multiplication or other functions of the current prediction mode and the result of the function. Usually, however, the prediction mode residue is a difference between the current prediction mode and the result of the function, such that the value of the prediction mode residue is minimized.

The prediction mode residue 140 is transmitted 145 to the decoder as part of the encoded bit-stream. Applicants herein are realized that statistically the smaller values of the prediction mode residue occur more frequently than larger values. Hence, one effect of the embodiments of the invention is that a size of the transmitted data is minimized.

The decoder 102 decodes and parses out the prediction mode residue 140 from the bit-stream. The decoder determines 120 the result of the function 125 in the way similar to the determination performed by the encoder. Next, the decoder combines 150 the prediction mode residue 140 with the result of the function 125. Typically, the combination 150 is a reverse operation of the combination 130. For example, the decoder adds the prediction mode residue 140 and the result of the function 125 to produce the current prediction mode 115. The current prediction mode is used to determine 160 the portion of the image 105 from the rest of the bit-stream data.

The decoder uses the same input to the function 175 as the encoder. For example, various embodiments select the input from the set of MPM. In some situations, the set of MPM is relatively small and includes zero, one or two elements. Also, the decoder does not need to track the frequency of usage of the prediction modes, because it is known prior to decoding or encoding that small prediction mode residues are more likely to occur than large prediction mode residues. Thus, another effect of some embodiments of the invention is that need for the ranking table tracking the frequency of usage of previous modes is eliminated, which save memory and computation time at the decoder.

Figure 2:
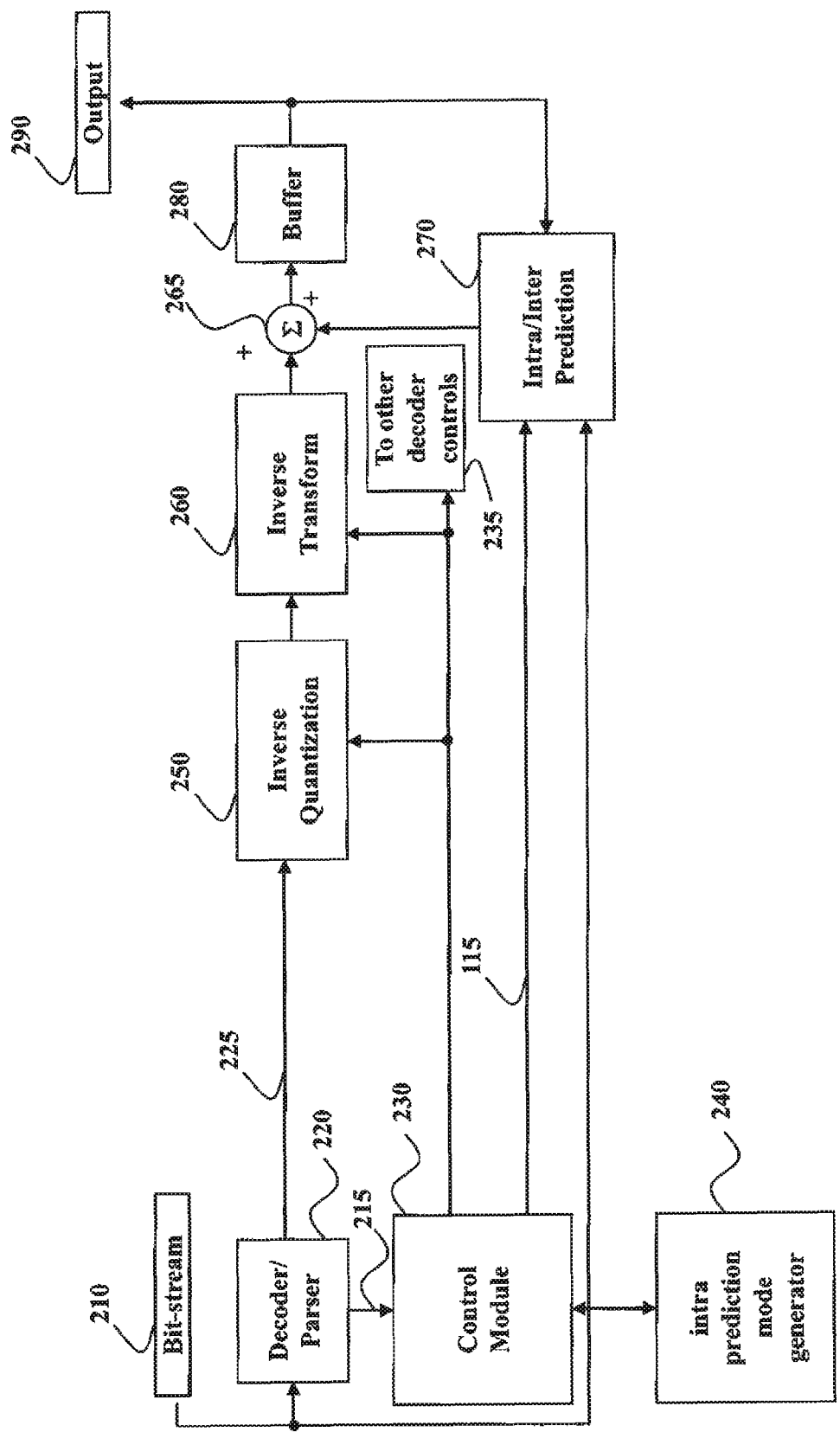
FIG. 2 is a block diagram of the decoder according to some embodiments of the invention.

FIG. 2 shows a block diagram of general structure of the decoder according to some embodiments of the invention. The decoder executes the steps of the method according to various embodiments described herein. The decoder can be implemented using, e.g., software, firmware or a processor connected to a memory and/or input/output interfaces.

A "central processing unit (CPU)" or a "processor" refers to a computer or a component of a computer that reads and executes software instructions. "Software" refers to prescribed rules to operate a computer. Examples of software include software; code segments; instructions; computer programs; and programmed logic. Software of intelligent systems may be capable of self-learning. A "module" or a "unit" refers to a basic component in a computer that performs a task or part of a task. It can be implemented by either software or hardware. A "memory" or a "computer-readable medium" refers to any storage for storing data accessible by a computer.

Input to the decoder is a bit-stream 210 representing at least the portion of the image. The bit-stream is decoded, e.g., entropy decoded, and parsed by a decoder and parser module 220 to obtain data including decoded transform coefficients 225 and control data 215. Decoded coefficients are inverse-quantized 250 and inverse transformed 260. When predictive coding 270 is used, previously-decoded data is combined 265 with the currently-decoded data to output 290 the portion of the image. That portion of the image is stored in a buffer 280 for subsequent decoding.

When intra prediction modes are used, data used for reconstruction comprises only data from the image currently being decoded. The control data 215 is decoded from the bit-stream by the module 220 and submitted to control module. The control data is used to control 235 various modules of the decoder and to facilitate the intra prediction 270. To that end, the control module 230 includes an intra prediction mode generator module 240 for determining the current prediction mode 115. The current prediction mode is used, along with the remaining data parsed from the bit-stream, by other components of the decoder.

Figure 3:
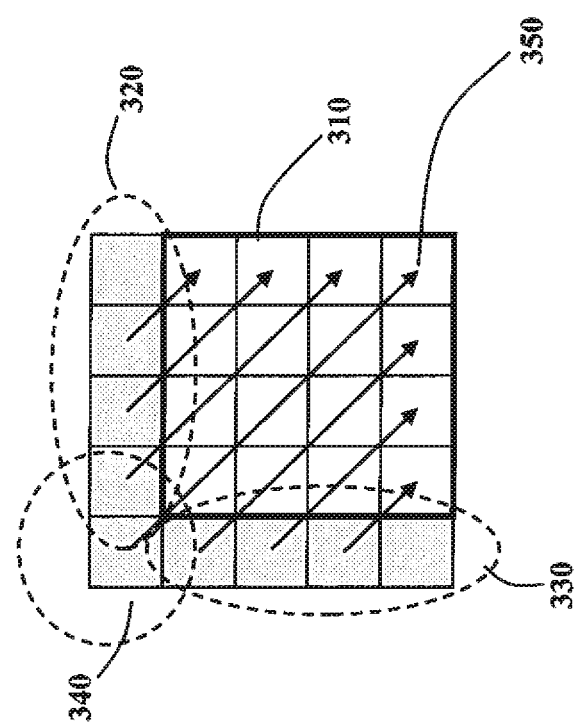
FIG. 3 shows an example of decoding a portion of an image using a prediction mode.

FIG. 3 shows an example of decoding the portion of the image using the prediction mode, wherein the previously decoded pixels of the image are used as reference pixels to predict pixels in the current portion of the image. Prediction occurs along the direction of prediction, which is determined by the prediction mode.

In various embodiments, the portion of the image includes a prediction unit (PU), e.g., a current PU 310. The previously-decoded pixels are selected from bottom, e.g., a row 320 of pixels from a top PU located above the current PU, from a right column 330 of pixels from a left PU located to the left of the current PU, and from bottom-right pixels 340 from top-left PU located above and to the left from the current PU.

After the current prediction mode is determined, the pixels of the current PU are predicted using previously-decoded pixels located on the lines 350 corresponding to the angle of the current prediction mode.

As described above, the current prediction mode is determined based on the function of a set of MPM. In some embodiments, the input to the function is a left prediction mode used to decode a left PU and a top prediction mode used to decode a top PU. For example, the function in one embodiment determines an average value of the left prediction mode and the top prediction mode. In another embodiment, the function determines a median value of the left prediction mode and the top prediction mode.

However, other previous prediction modes can also be used by the embodiments. For example, in some embodiments, modes from additional previously-decoded PUs are used to estimate the current prediction mode. For example, modes from the PU diagonally above-left and the PU diagonally above-right can be used along with angular modes in the MPM set. The mean or median of some or all those modes can be used to generate the estimation.

Similarly, in some embodiments the set of MPM includes M modes, where M>2. In one embodiment, the estimation of the current mode is the function of up to M modes. For example, the estimation is the mode closest to the average of all directional indices of modes in the set. Alternatively, the two previous prediction modes are selected as prediction modes of two neighboring portions of the image. Also, one embodiment scales the previous prediction mode by a weighting factor. In this embodiment, the estimation is skewed toward the prediction mode with the higher weighting factor.

Figure 4:
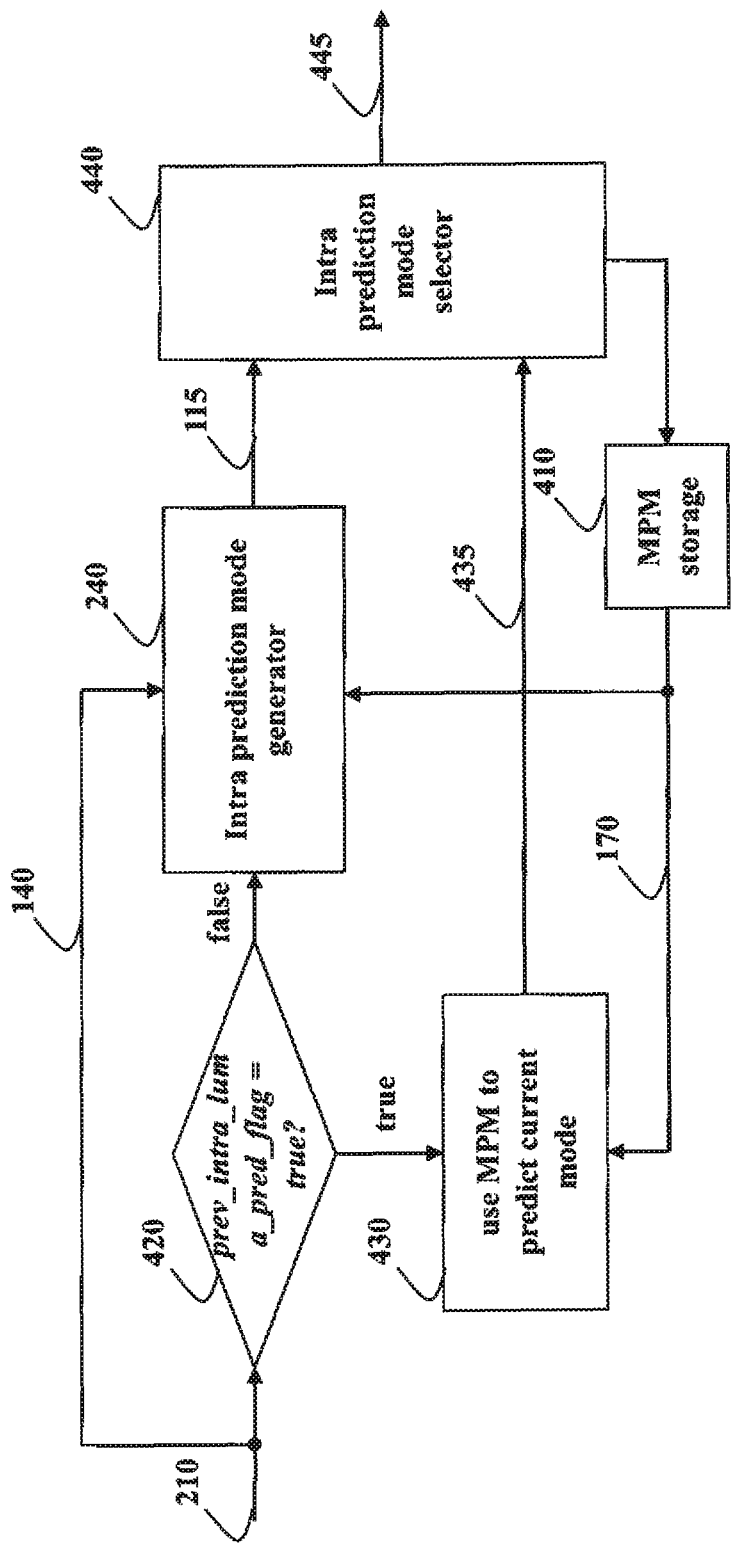
FIG. 4 is an example of the control module according to some embodiments of the invention.

FIG. 4 is an example of the control module 230 including the intra prediction mode generator 240. The input to this module is the bit-stream 210. The set of MPM 170 is formed by previous intra prediction modes of neighboring PUs and stored in a memory 410. A type check 420 determines a type of intra prediction. For example, a mode prediction flag, prev_intra_luma_pred_flag is parsed from the bit-stream. If this flag is true, then the type is "MPM" and the intra prediction mode for the current PU is determined 430 by selecting one of the modes in the stored MPM set. Otherwise, the flag is false, the type is "intra prediction" and the intra prediction mode generator 240 determines the current prediction mode for the current PU. An intra prediction mode selector 440 selects the intra prediction mode based on the type of the prediction and stores the intra prediction mode 445 in the set of MPM. The output from this module is the intra prediction mode for the current PU, which can be, e.g., the current prediction mode 115 or the prediction mode based on MPM 435.

Figure 5:
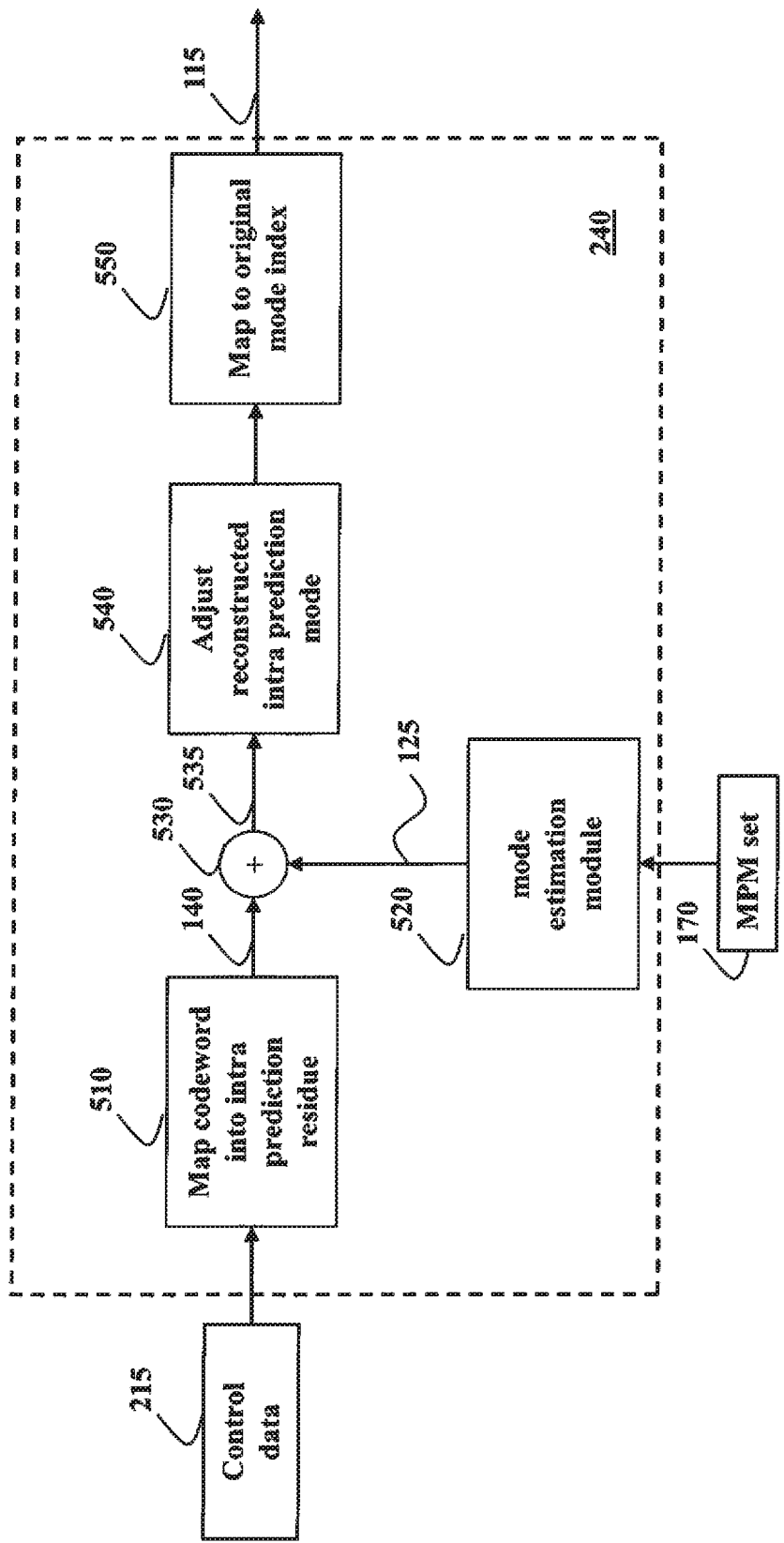
FIG. 5 is a block diagram of an intra prediction mode generator according to some embodiments of the invention.

FIG. 5 is a block diagram of the intra prediction mode generator according to one embodiment of the invention. The inputs to this module are the control data 215 including data for intra prediction mode residue and the set of MPM 170. The symbols of the control data representing the prediction mode residue may be entropy decoded from the bit-steam. In general, for fixed-codeword variable length codecs, a shorter length codeword is assigned to a symbol with smaller value. For binary arithmetic coders, a fixed length codeword or binarization of the symbol can be used. For example, the smallest integer value that is larger than or equal to $\log_2$(NumMode), where NumMode is the number of available angular intra prediction modes, is used as the length to represent the symbol of the residue to be decoded.

In alternative embodiment, codewords of variable length are used. Also, in some embodiments, different context models are assigned for different bins of the symbol of the codeword for binary arithmetic coders. A context model represents the state, or probability distribution, of a bin in an entropy coder. For example, bins 0 through 3, i.e., the three least-significant bits, can be assigned one context model, and bin 4 can be assigned a different context model.

Next, the symbols of the control data 215 are mapped 510 to produce the intra prediction mode residue 140. In one embodiment, each value of the symbol, ranging from 0 to NumMode−1, is mapped into a certain intra prediction mode residue, wherein NumMode is the number of available intra prediction modes. For example, if 2*R−1 is the value of the symbol, then the symbol is mapped to R for the intra prediction mode residue. If 2*R is the value of symbol, then the symbol is mapped to −R for the intra prediction mode residue. In this manner, the mapped intra prediction mode residues range from −NumMode/2 to NumMode/2, where NumMode is the number of available intra prediction modes.

Next, a mode estimation module 520 selects the function to estimate the prediction mode and determines the result of the function using, e.g., the modes in the set of MPM 170 as an input. For example, if there are two different angular intra prediction modes in the MPM set, and the function is selected to be median of modes in the set, then a value located at or next to the halfway-point between the two intra prediction modes on the circular representation is the result of the function. If there is only one angular intra prediction mode in the MPM set, then this mode or the mode adjacent to this mode is estimated.

Figure 6:
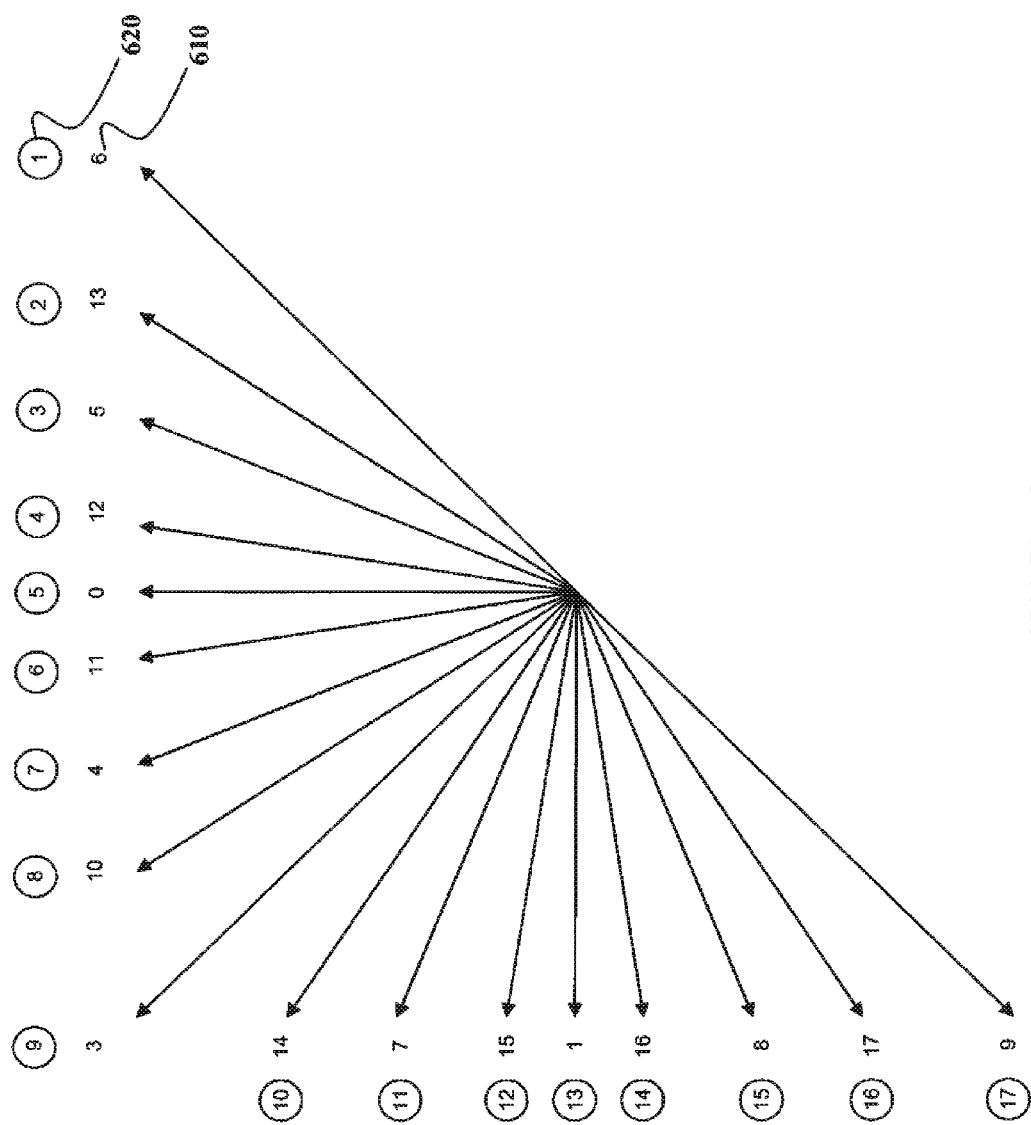

However, some embodiments of the invention take advantage of the recognition that the numbering scheme currently used in the working draft of the HEVC standard indexes a planar (non-angular) mode as 0, vertical mode as 1, horizontal mode as 2, DC mode (non-angular) as 3, and other angular modes with higher indices. It makes no sense to use these indices in a function such as averaging or computing the median, because adjacent prediction angles are not consecutively numbered. In order to use prediction mode indices in the function, some embodiments of the invention map the indices of the available prediction mode to a set of consecutive values, FIG. 6 shows an example of the mapping of possible angular intra prediction modes supported in the intra predictive coding process. In this example, there are 17 available directional prediction modes. Other variations are possible. The original indexing scheme for each mode is shown next to each arrow, e.g., an index 610, and the mapped index values are shown in the adjacent circles, e.g., a corresponding index 620.

Figure 7:
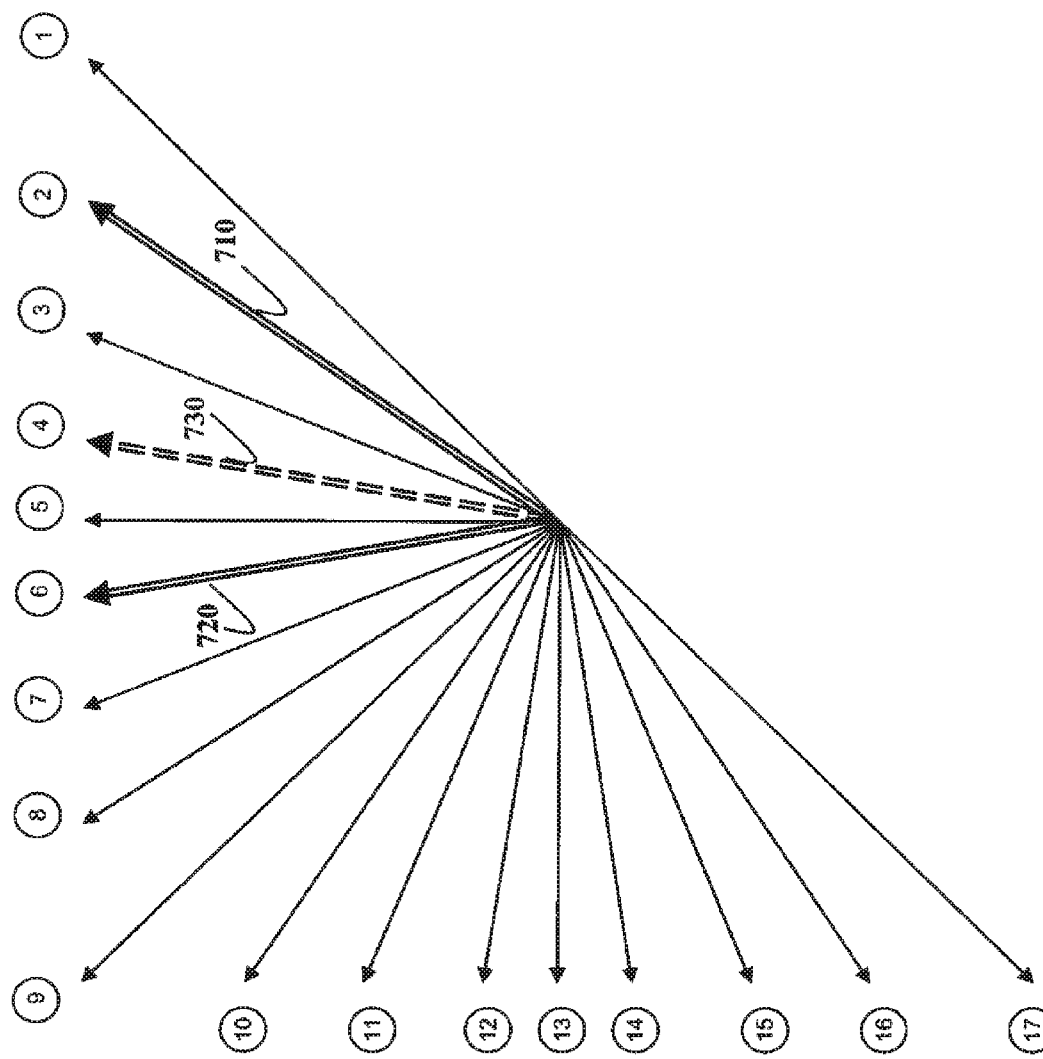

FIG. 7 shows an example of determining the result of the function to estimate the prediction mode. In this example, the MPM set includes modes 710 and 720 having mapped indices 2 and 6, respectively. The function is the median function and the result 730 of the function is 4, which is the median of {2, 3, 4, 5, 6}.

Figure 8:
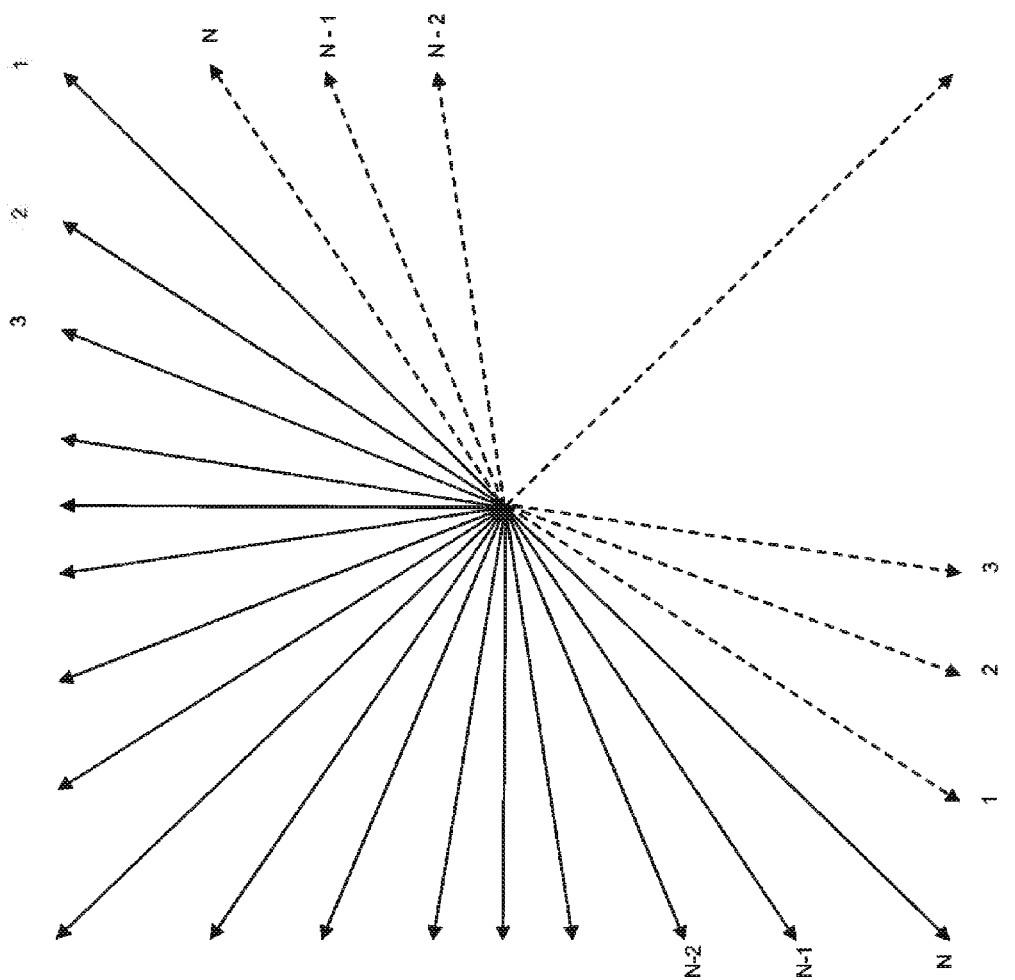

FIG. 8 shows generalization of the circular representation of the modes to N available prediction modes. Using this representation, the difference between any two angular modes can be defined as the distance between the two modes on the circular representation. Specifically, mode 1 and mode N are next to each other, and the distance between them is 1. Accordingly, in this example, the prediction mode residue is the distance between the current prediction mode and the result of the function describing an estimation of the prediction mode on the circular representation.

FIG. 9 shows an example of the circular representation according to one embodiment, wherein the distance between the two angular intra prediction modes in MPM are greater than certain value, e.g., greater than half of the number of available intra predictions modes. In this example, the MPM set includes modes 910 and 920 having the mapped indices 2 and 14, respectively. If the median of modes between 2 and 14 were used as estimation, then the result of the function would be 8. As shown in FIG. 9, however, mode 8 is almost orthogonal to both modes in the MPM set, which contradicts the concept that the current prediction mode is expected to be somewhat aligned with one or more modes in the MPM.

Accordingly, a symmetrical representation is used for one of the modes in the MPM set. For example, for the first mode 910 in the MPM set, which has the index of 2, the mode 940 having the same orientation, i.e., symmetrical to the first mode, and the index 2' is determined. Accordingly, in this example, the estimation 930 of the prediction mode has an index 16, which is the median of modes between 2' and 14, which comprises the set {14, 15, 16, 17, 2'}. For use in mathematical functions, an index 2' is equivalent to an index of 18. From FIG. 9, it can be seen that mode 16 is nearly aligned with both modes in the set of MPM, which is desirable for a good estimation.

Specifically, one embodiment determines whether the distance between two angular intra prediction modes in set of MPM is greater than for example half of the number of available intra prediction modes NumMode, then one of the modes is circularly-mapped so its distance from the other mode is less than half of NumMode. The mapping is accomplished by adding NumMode−1 to the mode that is mapped. Thus, if (m1, m2) are the two modes in the set of MPM, then the function used to compute the estimation of the current prediction mode operates on {m1+NumMode−1, m2}. If the output of the function is greater than NumMode, then NumMode is subtracted, yielding a valid index that lies between 1 and NumMode.

Referring back to FIG. 5, the current prediction mode for the portion of the image is reconstructed by combining 530, e.g., adding, the prediction mode residue to the result of the function. In various embodiments, the combining module 530 combines the prediction mode residue with the result of the function to produce an intermediate prediction mode 535. This is because the current prediction mode should range from 1 to NumMode, where NumMode is the number of available intra prediction modes. In such situations, an adjusting module 540 adjusts the intermediate prediction mode having value greater than NumMode or smaller than 1. For example, the value of the intermediate prediction mode is subtracted by NumMode−1 or the value is added by NumMode−1.

Similarly, if the function determines the average of the two modes from the set of MPM, the result of the function combined with the prediction mode residue may produce an unavailable prediction mode, e.g., not one of the 17 modes shown in FIGS. 6-7. In such situations, an adjusting module 540 selects the current prediction mode from a set of valid prediction modes using the intermediate prediction mode 435. In one embodiment, the adjusting module rounds a value of the intermediate prediction mode to a nearest valid prediction mode. In one variation of this embodiment, the rounding is performed in a direction of most frequent prediction mode.

Next, a mapping module 550 can map the current prediction mode to an original mode index and output the value of the current prediction mode 115 to the rest of the decoder.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for decoding at least a portion of an image, comprising steps of:
    determining a current prediction mode based on a combination of a prediction mode residue and a function of an index of at least one previous prediction mode wherein the prediction mode residue represents a difference between a result of the function and an index of the current prediction mode; and
    decoding the portion of the image using the current prediction mode, wherein the steps of the method are performed by a processor.

2. The method of claim 1, further comprising:
    receiving the prediction mode residue as a part of encoded bit-stream; and
    decoding and parsing the prediction mode residue from the bit-stream.

3. The method of claim 1, wherein the combination includes a summation of the prediction mode residue and a result of the function of at least one previous prediction mode, and wherein the prediction mode residue includes a difference between a result of the function and the current prediction mode.

4. The method of claim 1, wherein the previous prediction mode is angular intra prediction mode, and the result of the function is a prediction mode adjacent to the angular intra prediction mode.

5. The method of claim 1, wherein the portion of the image includes a current prediction unit (PU), and the function of at least one previous prediction mode determines an average value of a left prediction mode of a left PU and a top prediction mode of a top PU.

6. The method of claim 1, wherein the portion of the image includes a current prediction unit (PU), and the function of at least one previous prediction mode determines a median value of a left prediction mode of a left PU and a top prediction mode of a top PU.

7. The method of claim 1, wherein the determining further comprises:
    combining the prediction mode residue with a result of the function of at least one previous prediction mode to produce an intermediate prediction mode; and
    selecting the current prediction mode from a set of valid prediction modes using the intermediate prediction mode.

8. The method of claim 7, wherein the selecting includes:
    rounding the intermediate prediction mode to a nearest valid prediction mode.

9. The method of claim 8, wherein the rounding is performed in a direction of most frequent prediction mode.

10. The method of claim 1, wherein the function of at least one previous prediction mode is a function of at least two previous prediction modes.

11. The method of claim 10, further comprising:
    selecting the two previous prediction modes from a set of most probable modes (MPM); and
    storing the current prediction mode in the MPM.

12. The method of claim 10, further comprising:
    selecting the two previous prediction modes as prediction modes of two neighboring portions of the image.

13. The method of claim 12, wherein the two neighboring portions of the image include a left portion and a top portion of the image with respect to the portion of the image currently decoded.

14. The method of claim 10, further comprising:
selecting the two previous prediction modes as most frequently used prediction modes.

15. The method of claim 1, further comprising:
scaling the previous prediction mode by a weighting factor.

16. A decoder for decoding at least a portion of an image based on a current prediction mode, comprising:
- a decoding and parsing module for decoding and parsing bit-stream to produce transform coefficients and control data, wherein the control data includes a prediction mode residue representing a difference between a result of the function of a set of previous prediction modes and an index of the current prediction mode; and
- an intra prediction mode generator for determining the current prediction mode based on a combination of the prediction mode residue and the result of the function.

17. The decoder of claim 16, further comprising:
- a memory for storing a set of most probable modes (MPM);
- a prediction type module for determining a type of ultra prediction; and
- an intra prediction mode selector for selecting an intra prediction mode based on the type of intra prediction and for storing the current prediction mode in the set of MPM.

18. The decoder of claim 16, wherein the intra prediction mode generator comprises:
- a mode estimation module for determining the result of the function;
- a combining module for combining the prediction mode residue with a result of the function to produce an intermediate prediction mode;
- an adjusting module for selecting the current prediction mode from a set of valid prediction modes using the intermediate prediction mode; and
- a mapping module for mapping the current prediction mode to an original mode index.

* * * * *